United States Patent [19]

Taguchi

[11] Patent Number: 4,479,410
[45] Date of Patent: Oct. 30, 1984

[54] METHOD AND APPARATUS FOR CONTROLLING THE UPPER LIMIT OF A CUTTING BLADE IN CUTTING MACHINES

[75] Inventor: Masayuki Taguchi, Hadano, Japan

[73] Assignee: Amada Company Limited, Kanagawa, Japan

[21] Appl. No.: 417,349

[22] Filed: Sep. 13, 1982

[30] Foreign Application Priority Data

Sep. 11, 1981 [JP] Japan ............................ 56-142208
Aug. 11, 1982 [JP] Japan ......................... 57-120957[U]

[51] Int. Cl.³ .............................................. B23D 53/04
[52] U.S. Cl. .......................................... 83/13; 83/530; 83/796; 83/801
[58] Field of Search ................. 83/794, 796, 809, 813, 83/530, 527, 801, 789, 360, 13

[56] References Cited

U.S. PATENT DOCUMENTS

| | | | |
|---|---|---|---|
| 3,465,628 | 9/1969 | Komondowski et al. | 83/801 |
| 3,575,074 | 4/1971 | Aizawa | 83/796 |
| 3,721,139 | 3/1973 | Robinson et al. | |
| 3,780,814 | 12/1973 | Herb | 83/530 X |
| 3,875,839 | 4/1975 | Aizawa | 83/813 X |
| 4,091,698 | 5/1978 | Obear et al. | 83/530 X |

Primary Examiner—Frank T. Yost
Attorney, Agent, or Firm—Armstrong, Nikaido, Marmelstein & Kubovcik

[57] ABSTRACT

An oscillating bandsaw machine having apparatus to control the upward movement of the bandsaw to eliminate excessive travel.

8 Claims, 5 Drawing Figures

METHOD AND APPARATUS FOR CONTROLLING THE UPPER LIMIT OF A CUTTING BLADE IN CUTTING MACHINES

BACKGROUND OF THE INVENTION

1. Field of the Invention

The present invention relates generally to cutting machines such as horizontal bandsaw machines having a cutting blade such as a bandsaw blade held in a cutting head assembly to perform cutting operations and, more particularly, pertain to methods and apparatus for controlling the upward or returning movement of the cutting head assembly in cutting machines.

2. Description of the Prior Art

The prior art concerning the present invention will be described, by way of example, about what is called a horizontal bandsaw machine, although the present invention is applicable to a variety of cutting machines such as circular sawing machines.

As is well known, horizontal bandsaw machines comprise a base on which a workpiece or workpieces to be cut are to be placed and clamped and a cutting head assembly in which a flexible endless bandsaw blade is trained around a pair of wheels or pulleys, one of which is power driven to drive the bandsaw blade. In the cutting head assembly, the bandsaw blade is slidably held and guided with its cutting edge faced perpendicularly downwardly by a pair of guide means at the cutting zone where cutting is performed so that it may cut into the workpiece to be cut. The cutting head assembly is so arranged as to be raised away from and lowered toward the base by a suitable means such as a hydraulic motor around a hinge pin or along one or more vertically disposed guide means. Thus, in each cutting cycle, the cutting head assembly is firstly raised and then lowered towards the base so as to enable the bandsaw blade being driven therein around the wheels to cut the workpiece which has been placed and clamped on the base. Also, in automatic horizontal bandsaw machines there are provided arrangements for automatically raising and lowering the cutting head assembly and automatically feeding workpieces to be cut into the cutting zone after completion of each cutting cycle.

In the horizontal bandsaw machine of the above described arrangement, it is desired to minimize the up-and-down movement of the cutting head assembly in order to minimize the idling of the bandsaw blade. In other words, it is required to make the upper or returning limit of the bandsaw blade as low as possible depending upon the height or diameter of the workpiece to be cut. On the other hand, however, it is necessary to make the returning limit of the bandsaw blade a little higher than the top surface of the workpiece to be cut so as to prevent the bandsaw blade from being damaged by the workpiece being fed, since the workpiece is not exactly straight but more or less uneven. Accordingly, in order to minimize the idling of the bandsaw blade, it is further desired to lower the cutting head assembly carrying the bandsaw blade at a faster rate before the bandsaw blade cuts into the workpiece.

SUMMARY OF THE INVENTION

It is an object of the present invention to provide a method and apparatus for readily controlling the upper or returning limit of a cutting blade such as a bandsaw blade during its returning in a cutting machine such as a horizontal bandsaw machine.

It is another object of the present invention to provide a method and apparatus for determining the desired upper or returning limit of a cutting blade such as a bandsaw blade according to the shape or size of the workpiece to be cut in a cutting machine such as a horizontal bandsaw machine.

These objects can be accomplished by providing a cutting machine with a detecting means for detecting the height or vertical position of a cutting blade, a memory means for storing the desired upper or returning limit of the cutting blade and a comparing means for comparing an output produced from the said detecting means with an output produced from the said storing an output to stop the upward or returning movement of the cutting blade when the detected output from the detecting means is equal to the output from the memory means.

Other and further objects and advantages of the present invention will be apparent from the following description and accompanying drawings which, by way of illustration, show preferred embodiments of the present invention and the principle thereof.

DESCRIPTION OF THE PREFERRED EMBODIMENT

Figure 1:
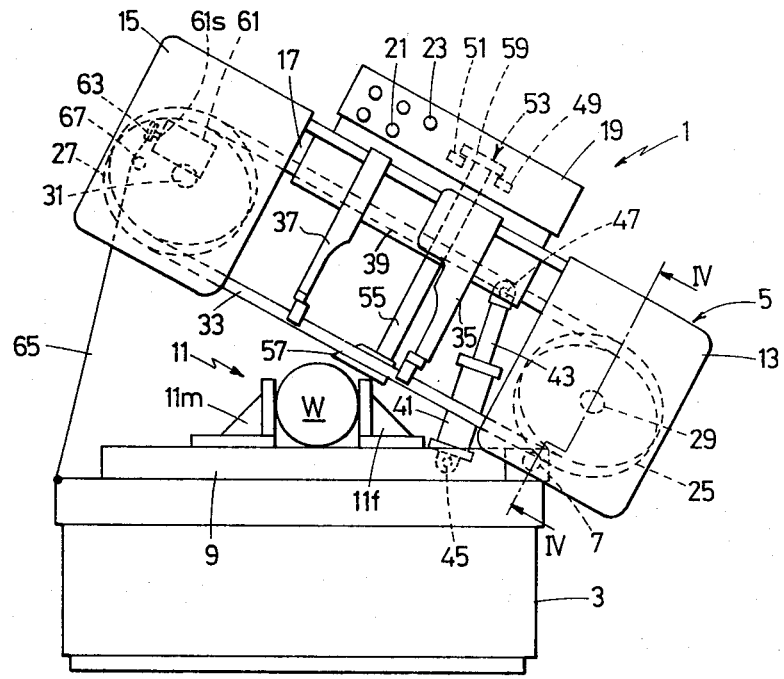
FIG. 1 is a front elevational view of a horizontal bandsaw machine embodying the principles of the present invention.

Referring to FIG. 1, the present invention will be described as embodied in a horizontal bandsaw machine which is generally designated by the numeral 1, although the present invention is applicable not only to horizontal bandsaw machines but also other cutting machines such as circular sawing machines.

Figure 3:
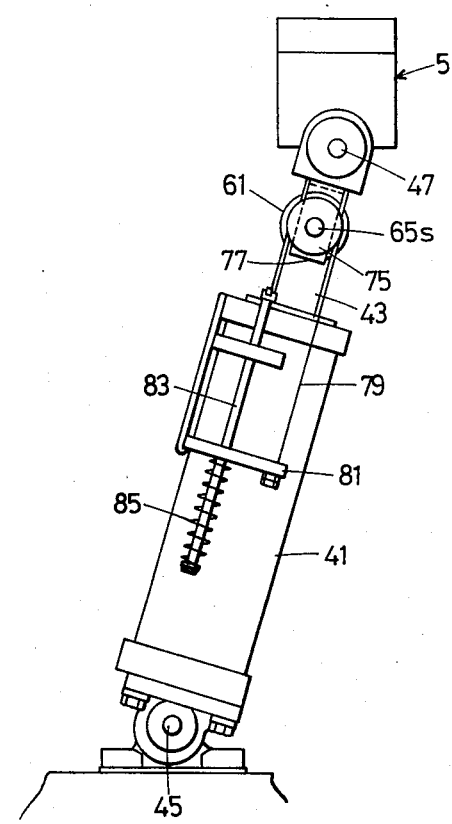
FIG. 3 is a front elevational view of a portion of the horizontal bandsaw machine of the third embodiment of the present invention.

The horizontal bandsaw machine 1 comprises a box-like base 3 and a cutting head assembly 5 which is pivotally connected to the base 3 by means of a hinge pin 7 to be movable up and down toward and away from the same. The base 3 is provided at its top with a work-table 9 on which a workpiece W to be cut can be placed, and the work-table 9 is provided with a vise assembly 11 which has a fixed jaw 11f and a movable jaw 11m to clamp the workpiece W therebetween. The cutting head assembly 5 has spaced housing sections 13 and 15 connected with each other by a beam member 17 and is provided at its top with a control box 19 which has a variety of controls including a blade starting button 21 and a pilot lamp 23. In the cutting head assembly 5, a pair of a driving wheel 25 and a driven wheel 27 having shafts 29 and 31, are enclosed in the housing sections 13 and 15, respectively, and a flexible endless bandsaw blade 33 is trained therearound so that it may be driven to make a cutting action when the driving wheel 25 is power driven. The bandsaw blade 33 is slidably held or guided with its cutting edge faced perpendicularly downwardly by a pair of a fixed guide assembly 35 and a movable guide assembly 37 so that a cutting stretch may be provided therebetween at the cutting zone of the horizontal bandsaw machine 1. The fixed and movable guide assemblies 35 and 37 are mounted on a guide way 39 which is fixed to the beam member 17 in a manner such that they depend therefrom in parallel with each other. The fixed guide assembly 35 is fixedly mounted on the guide way 39 while the movable guide assembly 37 is so mounted that it may be fixed on the guide way 39 in operation but may be moved toward and away from the fixed guide assembly 35 to adjust the cutting stretch of the bandsaw blade 33 according to the size of the workpiece W to be cut. Also, the cutting head assembly 5 of the above described construction is so arranged as to be swung up and down around the hinge pin 7 by a hydraulic motor 41 of a cylinder type having a piston rod 43 to feed and return the bandsaw blade 33 into and away from the workpiece W to be cut. As is shown in FIGS. 1 and 3, the hydraulic motor 41 is pivotally connected to the base 3 by means of a hinge pin 45 and the piston rod 43 of the hydraulic motor 41 is also pivotally connected to the cutting head assembly 5 by means of a hinge pin 47 in the preferred embodiment. Thus, when the cutting head assembly 5 is swung down around the hinge pin 7 from its raised position, the bandsaw blade 33 rotating around the driving wheel 25 and the driven wheel 27 in the cutting head assembly 5 will be fed to cut the workpiece W clamped by the vise assembly 11 on the work-table 9. As is well-known, the cutting head assembly 5 can be automatically raised and lowered for each cutting cycle, and the workpiece W to be cut can be automatically fed into and clamped by the vise assembly 11 after completion of each cutting action.

As shown also in FIG. 1, on order to control the lowering of the cutting head assembly 5, a valve means 49 such as a check valve and a switch means 51 such as a limit switch are provided in the control box 19 mounted on the top of the cutting head assembly 5. The valve means 49 is so arranged in a known manner as to enable the cutting head assembly 5 to lower toward the workpiece W to be cut at a higher speed when pushed and slow down the cutting head assembly 5 to enable the bandsaw blade 33 to make an accurate and economical cutting action when it is not pushed under pressure. Also, the switch means 51 is so arranged as to close its contact when pushed under pressure for a purpose which will be described in detail hereinafter.

In order to control or push and release the valve means 49 and the switch means 51, a sensing and controlling means 53 is mounted on the cutting head assembly 5 so that it may be freely moved up and down between the fixed and movable guide assemblies 35 and 37 and in and through the control box 19. The sensing and controlling means 53 comprises an elongate bar member 55 a sensing member 57 and a controlling member 59 and it is mounted on the cutting head assembly 5 with the elongate bar member 55 slidably disposed between the fixed and movable guide assemblies 35 and 37 in parallel therewith. The elongate bar member 55 is of a length extending substantially from the control box 19 to the bandsaw blade 33, and the sensing member 57 and the controlling member 59 are fixed to the lower end and the upper end, respectively, of the elongate bar member 55. The sensing member 57 and the controlling member 59 are each of a longish member, and the former is fixed to the lower end of the elongate bar member 55 at right angles in a L-shaped form, while the latter is fixed to the upper end thereof at right angles in a T-shaped form.

The sensing and controlling means 53 is so disposed as to bring the controlling member 59 into contact with the valve means 49 and the switch means 51 when moved down and contrarily bring the same out of contact therewith when moved up. Of course, the sensing member 57 of the sensing and controlling means 53 will be simultaneously moved toward and away from the workpiece W to be cut when the controlling member 59 is moved into and out of contact with the valve means 49 and the switch means 51. Also, the sensing and controlling means 53 is so arranged that the sensing member 57 will depend slightly lower than the cutting edge of the bandsaw blade 33 when the controlling member 59 is in contact with or rides on the valve means 49 and the switch means 51.

In the above described arrangement, when the cutting head assembly 5 has been raised to keep the sensing member 57 out of contact with the workpiece W to be cut, the controlling member 59 will be urged to the valve means 49 and the switch means 51 by the whole gravity of the sensing and controlling means 53. On the other hand, the controlling member 59 will be brought away out of contact with the valve means 49 and the switch means 51 as soon as the sensing member 57 is brought into contact with the workpiece W to be cut when the cutting head assembly 5 is lowered. Also, the sensing member 57 will be brought into contact with the workpiece W to be cut ahead of the bandsaw blade 33 and remain thereafter on the workpiece W together with the whole sensing and controlling means 53 without being further lowered when and as the cutting head assembly 5 is lowered. Of course, the bandsaw blade 33 will go on lowering together with the cutting head assembly 5 to cut into the workpiece W while the sensing member 57 remains on the workpiece W after having been brought into contact therewith. Also, when the cutting head assembly 5 is raised after a completion of a cutting cycle, the valve means 49 and the switch means 51 will be initially brought into contact with the controlling member 59 and then will raise the whole sensing and controlling means 53.

Referring further to FIG. 1, a potentiometer 61 is mounted as a detecting means on a portion of the cutting head assembly 5 in order to detect the height or vertical position of the bandsaw blade 33. The potentiometer 61 is provided with a rotary shaft 61s which has a stationary wiper (not shown in FIG. 1 but designated by 61w in FIG. 5) and is kept biased in one direction by a biasing means (not shown) such as a power spring or a torsion spring. Anyway, the potentiometer 61 is so arranged as to produce an output that is voltage according to the rotation of the rotary shaft 61s in a manner which is known by those skilled in the art. For the purpose of rotation, the rotary shaft 61s of the potentiometer 61 is provided with a wheel or pulley 63 to which a string member 65 such as a chain or a wire is connected in such a manner as to be wound up therearound and be extended therefrom. The string member 65 is connected at its other end to the base 3, and it is trained on an idle wheel 67 freely rotatably provided on the cutting head assembly 5 in the preferred embodiment. In this arrangement, the rotary shaft 61s of the potentiometer 61 will be rotated against its biasing means by the string member 65 when the cutting head assembly 5 is being raised together with the potentiometer 61. Of course, the rotary shaft 61s of the potentiometer 61 will be reversely rotated by its biasing means to wind up the string member 65 as the cutting head assembly 5 is lowered from its raised position to loosen the string member 65. Thus, it will be understood that the potentiometer 61 will produce an output or voltage corresponding to the height or vertical position of the cutting head assembly 5 or the bandsaw blade 33. In this connection, it will be apparent that another kind of detecting means such as an encoder can be used instead of the potentiometer 61 for the purpose of the present invention, as the description proceeds.

Figure 2:
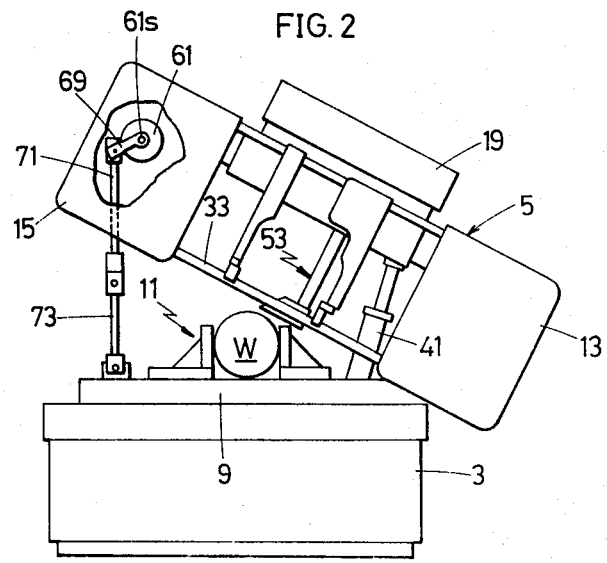
FIG. 2 is a front elevational view, with a portion broken away, of the second embodiment of the present invention.

Referring to FIG. 2, there is shown a second embodiment in which a lever 69 is fixed to the rotary shaft 61s of the potentiometer 61 and is pivotally connected at its end to a link 71 which is connected pivotally to another link 73 which is pivotally connected to the base 3. In this arrangement, the rotary shaft 61s of the potentiometer 61 will be rotated by the lever 69 to produce an output when the cutting head assembly 5 is raised and lowered together with the potentiometer 61. It will be understood that the potentiometer 61 can be attached to any portion of the cutting head assembly 5 or any parts which are to be raised and lowered together with the cutting head assembly 5.

Referring to FIG. 3, there is shown a third embodiment in which the potentiometer 61 is provided with a pulley 75 on its rotary shaft 61s and is mounted on the piston rod 43 of the hydraulic motor 41 by means of a bracket 77. In order to rotate the rotary shaft 61s of the potentiometer 61, a string member 79 is trained around the pulley 75, and it is connected at one end to a bracket 81 fixed to the hydraulic motor 41 and is connected at the other end to a slide rod 83 downwardly biased by a spring 85. The slide rod 83 is slidably held on the bracket 81 in such a manner as to be movable up and down and is always kept downwardly biased by the spring 85 to bias the string member 79 downwardly to the pulley 75. Thus, the pulley 75 will be rotated by the string member 79 to rotate the rotary shaft 61s of the potentiometer 61 when the piston rod 43 is extended out of the hydraulic motor 41 to raise the cutting head assembly 5. Also, the pulley 75 will be reversely rotated by the spring 85 by means of the string member 79 when the piston rod 43 is retracted into the hydraulic motor 41 to lower the cutting head assembly 5.

Figure 4:
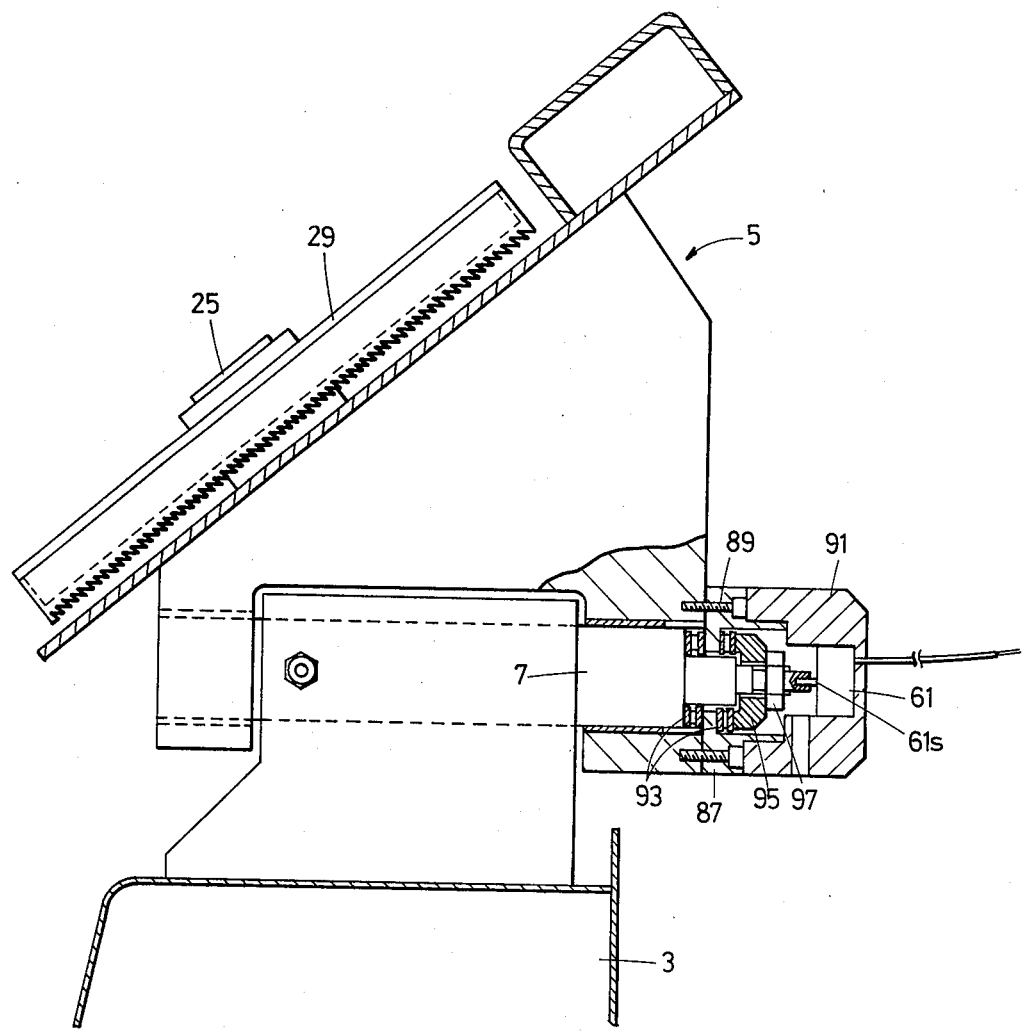
FIG. 4 is a sectional view taken along the line IV—IV of FIG. 1 and showing the fourth embodiment of the present invention.

Referring to FIG. 4, showing a fourth embodiment, the potentiometer 61 for detecting the height or vertical position of the cutting head assembly 5 can be mounted also on or in connection with a portion of the hinge pin 7. For this purpose, a flanged ring member 87 is fixed to the cutting head assembly 5 by a plurality of bolts 89 in such a manner as to surround the end of the hinge pin 7, and a cap like housing 91 is mounted on the flanged ring member 87 to hold the potentiometer 61 in a manner such that the shaft 61s of the potentiometer 61 is connected to the hinge pin 7. Also, in order to enable the flanged ring member 87 to smoothly rotate around the hinge pin 7, there is provided a plurality of the thrust bearings 93 which are held on the end of the hinge pin 7 by means of a circular holding member 95 and a nut 97. Thus, when the cutting head assembly 5 is swung up and down around the hinge pin 7, the flanged ring member 87 will be rotated around the hinge pin 7 to cause the potentiometer 61 to be rotated around its shaft 61s which is fixed on the end of the hinge pin 7. Accordingly, it is understood that output voltage corresponding to the height or vertical position of the cutting head assembly 5 will be produced from the potentiometer 61 when the cutting head assembly 5 is swung up and down by the hydraulic motor 41 since the shaft 61s of the potentiometer 61 is fixed to the end of the hinge pin 7.

From the above descriptions, it will be understood that the potentiometer 61 shown in FIGS. 1, 2, 3 and 4 will produce an output as a signal corresponding to the height or vertical position of the cutting head assembly 5, when the cutting head assembly 5 is raised by means of hydraulic motor 41. Also, it is to be noted that any kind of detecting means such as an encoder can be used in place of the potentiometer 61 as has been described hereinbefore.

Figure 5:
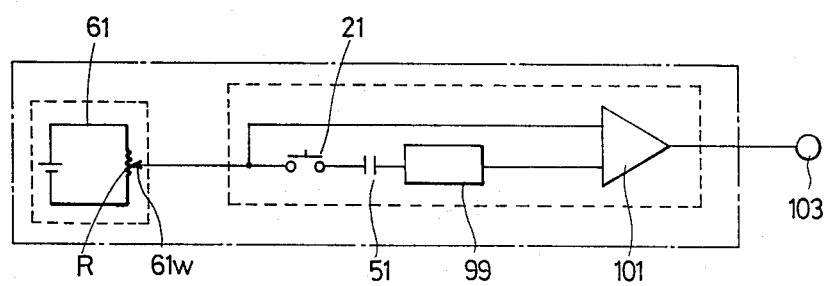
FIG. 5 is a block diagram showing a control circuit for the horizontal bandsaw machine embodying the principles of the present invention.

Referring to FIG. 5, there is shown a control circuit in which the potentiometer 61 having the wiper 61w is included together with the switch means 51 and the blade starting button 21 so as to control the upper or returning limit of the bandsaw blade 33. Since the potentiometer 61 is employed as the detecting means in the preferred embodiment, the arrangement is such that a potential dividing rate or ratio will be determined according to the position of the wiper 61w of the potentiometer 61 to the resistance R so that an output voltage will be delivered as an electrical signal according to the position of the wiper 61w. In addition to the potentiometer 61, the switch means 51 and the blade starting button 21, the control circuit comprises an analog memory means 99 storing an analog signal for a time and a comparator 101 which is connected to a relay 103 for stopping the cutting head assembly 5 from being raised. The analog memory means 99 is connected to the potentiometer 61 by means of the blade starting button 21 and the switch means 51 to store the output voltage produced thereby, and it is also connected to the comparator 101 to transmit the stored voltage to the same. Particularly, the memory means 99 is so arranged as to receive and store the output voltage which is sent from the potentiometer 61 according to the height or vertical position of the bandsaw blade 33 only when the blade starting button 21 has been put on and also the contact of the switch means 51 has been closed. The comparator 101 is connected to the potentiometer 61 and the memory means 99, and it is so arranged as to compare the output voltage sent from the memory means 99 with the output voltage directly sent from the potentiometer 61 and send an output signal to the relay 103 when the both the output voltages are equal. Also, it is desirable that the pilot lamp 23 provided in the control box 19 be lighted up when the analog signal is stored in the memory means 99.

In the above described arrangement, the contact of the switch means 51 will be closed when the cutting head assembly 5 is raised as shown in FIGS. 1 and 2 to keep the switch means 51 depressed by the controlling member 59 of the sensing and controlling means 53 has been described hereinbefore. Accordingly, an output voltage corresponding to the height or vertical position of the bandsaw blade 33 which is produced by the potentiometer 61 will be stored into the memory means 99 when the blade starting button 21 is put on when the cutting head assembly 5 is raised to keep the switch means 51 depressed by the controlling member 59. On the other hand, the comparator 101 will go on comparing the output voltage sent from the memory means 99 and the output voltage produced by the potentiometer 61 to send a signal to the relay 103 to stop the cutting head assembly 5 when both the voltages are equal. Thus, the cutting head assembly 5, when being raised, will be stopped to stop the bandsaw blade 33 from being raised at the height at which the blade starting button 21 has been put on during the initial lowering of the cutting head assembly 5. Also, it will be understood that no output voltage can be stored into the memory means 99 from the potentiometer 61 even if the blade starting button 21 is erroneously put on when the bandsaw blade 33 is cutting the workpiece W, since the switch means 51 is not depressed to close its contact when the bandsaw blade 33 is cutting the workpiece W.

In operation, the upper or returning limit of the bandsaw blade 33 is initially determined according to the diameter or vertical thickness of the workpiece W to be cut so that the bandsaw blade 33 can be stopped just above the workpiece W from being raised together with the cutting head assembly 5 in each cutting cycle. For this purpose, when it is desired to begin to cut the workpiece W, the cutting head assembly 5 is initially raised as shown in FIGS. 1 and 2 so as to bring up the bandsaw blade 33 higher than the top of the workpiece W and also enable the switch means 51 to be depressed by the controlling member 59 of the sensing and controlling means 53. Then, the cutting head assembly 5 is lowered, and the blade starting button 21 is manually put on when the bandsaw blade 33 is lowered to the upper or returning limit just above the top surface of the workpiece W to be cut where the bandsaw blade 33 should be stopped from being raised in each cutting cycle. As has been described hereinbefore, the switch means 51 will be kept depressed by the controlling means 53 to close its contact when the bandsaw blade 33 is at its upper or returning limit, since the sensing member 57 of the sensing and controlling means 53 has not been brought into contact with the workpiece W to be cut. Thus, the height or vertical position of the bandsaw blade 33 which will be detected by the potentiometer 61 will be stored into the memory means 99 as the upper or returning limit of the bandsaw blade 33 when the blade starting button 21 is depressed when the bandsaw blade 33 has been lowered to be just above the top surface of the workpiece W.

With the blade starting button 21 manually put on the bandsaw blade 33 will be driven around the driving and driven wheels 25 and 27, and also it will be lowered at a faster speed by the cutting head assembly 5 until the sensing member 57 of the sensing and controlling means 53 is brought into contact with the workpiece W to be cut. As soon as the sensing member 57 is brought into contact with the workpiece W, the controlling member 59 of the sensing and controlling means 53 will be brought out of contact with the valve means 49 and the switch means 51 as has been described hereinbefore. Accordingly, as soon as the sensing member 57 is brought into contact with the workpiece W, the bandsaw blade 33 will be slowed down to cut into the workpiece W as has been also described hereinbefore. Also, after the sensing member 57 has been brought into contact with the workpiece W, the contact of the switch means 51 will be opened so that no output produced by the potentiometer 61 can be stored into the memory means 99 even if the blade starting button 21 is erroneously put on. Then, as soon as the bandsaw blade 33 has cut the workpiece W, the cutting head assembly 5 will be returned by the hydraulic motor 41 to bring up the bandsaw blade 33 to begin another cutting cycle. When the bandsaw blade 33 is being raised by the cutting head assembly 5, the potentiometer 61 will go on detecting the height or vertical position of the bandsaw blade 33 and sending an output voltage into the comparator 101, and the comparator 101 will go on comparing the output voltage sent from the potentiometer 61 and the voltage stored in the memory means 99. Also, when the output voltage detected by the potentiometer 61 is equal to the voltage stored in the memory means 99, the comparator 101 will send a signal to the relay 103 so that the bandsaw blade 33 will be stopped from being raised at the upper or returning limit. After being stopped at the upper or returning limit, the bandsaw blade 33 will be again lowered toward the workpiece W to be cut together with the cutting head assembly 5 to perform another cutting cycle. The same operation will be repeated in each cutting cycle so that the bandsaw blade 33 will be stopped from being raised at the upper or returning limit in each cutting cycle.

As has been far described in the above, the upper or returning limit of the bandsaw blade 33 can be easily set or determined depending upon the size and shape of the workpiece W to be cut according to the present invention. In order to set the upper limit of the bandsaw blade 33, it is only necessary to put on the blade starting button 21 when the bandsaw blade 33 is lowered by the cutting head assembly 5 to just above the top surface of the workpiece W to be cut namely the desired upper or returning limit of the same. Also, the upper or returning limit of the bandsaw blade 33 cannot be erroneously changed during a cutting operation even if the blade starting button 21 is erroneously put on, since the switch means 51 is kept not depressed by the controlling member 59 of the sensing and controlling means 53 when the bandsaw blade 33 is cutting the workpiece W. Accordingly, according to the present invention, the upper or returning limit of the bandsaw blade 33 is easily set and positively maintained to minimize the idling of the bandsaw blade 33. Also, it will be understood that the present invention is applicable not only to the horizontal bandsaw machine but also to any other cutting machines such as a circular sawing machine having a cutting head assembly holding a cutting blade.

Although preferred forms of the present invention have been illustrated and described, it should be understood that the device is capable of modification by one skilled in the art without departing from the principles of the invention. Accordingly, the scope of the invention is to be limited only by the claims appended hereto.

I claim:

1. A method of controlling the upper or returning height of a cutting blade mounted in a cutting head of a cutting machine, said method comprising the steps of:
   (a) actuating a blade starting switch;
   (b) detecting the height of said blade when said starting switch is actuated;
   (c) storing the detected height of said blade when said starting switch is actuated;
   (d) continuously detecting the height of said blade;
   (e) comparing the continually detected blade height with the stored value in said memory; and
   (f) providing a signal, for stopping the upward movement of the cutting head means, when the detected height is equal to the stored detected height.

2. An apparatus for controlling the upper or returning height of a cutting blade mounted in a cutting head means of a cutting machine, said apparatus comprising:

(a) detecting means for detecting the height of said cutting head means;
(b) blade starting switch means;
(c) memory means, coupled to said detecting means and said blade starting switch means, said memory means storing the output of said detecting means upon actuation of said blade starting switch means; and
(d) comparator means, coupled to said detecting means and said memory means, for comparing the output of said detecting means to the value stored in said memory means, and for providing an output signal for stopping the raising of said cutting head means when the output of said detecting means is equal to the value stored in said memory means.

3. An apparatus as set forth in claim 2 including workpiece detecting means mounted on said cutting head for detecting a workpiece prior to contact between the workpiece and the cutting blade, wherein the value stored in said memory means cannot be changed when said workpiece detecting means contacts said workpiece.

4. An apparatus as set forth in claim 3 wherein said blade starting switch means, said workpiece detecting means, and said memory means, are electrically connected in series.

5. An apparatus as set forth in any one of claims 2-4 wherein said detecting means is mounted on said cutting head means and includes a string member connected to the base of the cutting machine.

6. An apparatus as set forth in any one of claims 2-4 wherein said detecting means is mounted on said cutting head means and includes a link means connected to the base of the cutting machine.

7. An apparatus as set forth in any one of claims 2-4 wherein said detecting means is mounted on a piston rod member of a hydraulic motor for raising and lowering said cutting head means and includes a string member connected to said hydraulic motor.

8. An apparatus as set forth in any one of claims 2-4 wherein said detecting means is provided at the center of the swinging movement of said cutting head means and includes rotary shaft means connected to a hinge pin for said cutting head means.

* * * * *